United States Patent [19]
Ida

[11] Patent Number: 5,772,440
[45] Date of Patent: Jun. 30, 1998

[54] BINARY INFORMATION DISPLAY DEVICE

[75] Inventor: Takashi Ida, Omiya, Japan

[73] Assignee: Mitsubishi Materials Corporation, Japan

[21] Appl. No.: 537,238

[22] Filed: Sep. 29, 1995

[30] Foreign Application Priority Data

Sep. 30, 1994 [JP] Japan .................................. 6-238196

[51] Int. Cl.$^6$ .................................................. G09B 21/00
[52] U.S. Cl. ........................................ 434/114; 340/407.1
[58] Field of Search ...................... 434/114, 113, 434/112; 340/407.1

[56] References Cited

U.S. PATENT DOCUMENTS

| | | | |
|---|---|---|---|
| 4,871,992 | 10/1989 | Petersen | 434/114 X |
| 5,086,287 | 2/1992 | Nutzel . | |
| 5,209,584 | 5/1993 | Galarneau . | |
| 5,453,012 | 9/1995 | Hudecek | 434/114 |

FOREIGN PATENT DOCUMENTS 4333399  3/1994  Germany ................................ 434/113

*Primary Examiner*—Jeffrey A. Smith
*Attorney, Agent, or Firm*—Anthony J. Casella; Gerald E. Hespos; Ludomie A. Budzyn

[57] ABSTRACT

The present invention relates to a compact and precise binary information display device having a simple structure at low cost.

The device includes a drive mechanism (13) to extrude and retract pins (11) from and into a display surface (12a). The drive mechanism is composed of a linear cam (16) to be moved orthogonal to the axis of the pins (11) and to move the pins (11) in their axial direction. The display device has a linear movement mechanism (17) including a stepper motor (20) for moving the linear cam (16) linearly, a conversion mechanism (21) for converting a rotary motion of a shaft (19) of the stepper motor (20) into a linear motion of the linear cam (16), and a reset mechanism (22) for setting an original position of the stepper motor (20) when the linear cam (16) reaches a reference position. Downsizing of the device is enabled by reducing the dimension thereof in the crosswise direction and the entire device is simplified by eliminating a rotational position detector.

3 Claims, 2 Drawing Sheets

BINARY INFORMATION DISPLAY DEVICE

BACKGROUND OF THE INVENTION

1. Field of the Invention

The present invention relates to a binary information display device which displays information represented by binary numbers, such as braille, by separately extruding and retracting a plurality of pins spaced in parallel from and into a display surface.

2. Description of the Related Art

As this kind of binary information display device, there is provided a braille display device having the structure disclosed in, for example, German Published Unexamined Patent Application No. DE4333399A1.

In this braille display device 1, as shown in FIG. 6, a plurality of pins 2 for displaying raised portions of braille are spaced in parallel, and fitted respectively in a plurality of through holes 4 formed through a planar support member 3, so that the pins 2 are slidable separately in the axial direction. A cylindrical cam 5 having an axis orthogonal to the pins 2 is located in contact with one end of each pin 2. By rotating the cam 5 on the axis thereof, the pins 2 are extruded and retracted from and into the support member 3, following recesses 5a and projections 5b formed on the surface of the cam 5.

In the braille display device 1 having such structure, different pins 2 are extruded from the surface of the support member 3 by changing combinations of the pins 2 and the recesses and projections of the cam 5 in accordance with the rotation angle of a motor 6 directly connected to the cam 5, so that various braille dots can be displayed.

When various braille letters are displayed by rotating the cylindrical cam 5, it is necessary to accurately grasp the rotation angle position of the cam 5, that is, the rotation angle position of the motor 6 is directly connected to the cam 5.

Conventionally, a rotational position detector (not shown), such as an encoder, is attached to the motor 6 as a means for grasping the rotation angle position of the motor 6.

An original position of the rotational position detector is reset in a state in which the cam 5 is set in a reference position selected properly, by which the rotation angle position of the cam 5 is known from the relative rotational angle of the rotational position detector with respect to the original position.

On the other hand, a stepper motor is widely and commonly used as a compact control motor having a simple structure. This stepper motor is rotated only at a predetermined rotation angle by magnetic attraction or magnetic repulsion by switching exciting current of a coil in response to each pulse signal. Therefore, the stepper motor has advantages of allowing power conversion from pulses to torque under open-loop digital control, and of achieving a low-cost drive mechanism which causes few accumulated errors.

PROBLEMS TO BE SOLVED BY THE INVENTION

However, the use of a stepper motor in the braille display device 1 having the above-mentioned structure has the following problems:

First, if a rotational position detector is used to determine the rotation angle position of the cam 5, the advantage of the stepper motor in control without any rotational position detector is impaired, and this is undesireable. Furthermore, the structure, including mechanisms and wires for connecting the rotational position detector, is complicated, and therefore, the whole device is expensive.

Secondly, when the original position of the stepper motor is reset without using any rotational position detector in order to obviate the above-mentioned inconveniences, it is impossible to simply determine the original position.

In this case, the position where the stepper motor is stopped by the application of a pulse potential having a predetermined pattern to the coil thereof is set as the original position. In the stepper motor, more than two rotation angle positions are sometimes set relative to a pulse potential of a single pattern to be applied to the coil in order to improve the resolution.

Thirdly, since recesses and projections need to be formed in a plurality of patterns on the surface formed by a turn of the cylindrical cam 5 in the circumferential direction, if the number of patterns increases, inevitably the diameter of the cam 5 also increases. This makes it difficult to downsize the device, in particular, to reduce the dimension of the device in the adjoining direction.

Furthermore, when the cam 5 and the motor 6 are directly connected, the operation of the pins 2 highly depends on the shape of the cam 5. Therefore, it seems that the cam 5 is required to be worked with extremely high accuracy, and thus production costs increase.

A braille display device without a stepper motor has been suggested. In particular, a braille display device has been proposed with an actuator made of bimetal for pressing the bottom ends of the pins 2 instead of the aforesaid cam 5. According to this braille display device, the inconveniences in use of the above stepper motor are not caused, and the size of the device in the direction orthogonal to the arrangement direction of the pins 2 is limited to some extent.

However, since high-voltage power is generally needed to drive the actuator made of bimetal, a large power supply device is needed separately from the main body of the braille display device. This also makes it difficult to downsize the whole device. Furthermore, such a braille display device cannot respond to the demand for portability for the above reason.

The present invention has been made in view of the above-mentioned circumstances, and it is an object of the present invention to provide a compact and high-precision binary information display device with a simple structure at low cost without using any rotational position detector such as an encoder.

SUMMARY OF THE INVENTION

In order to achieve the above object, the present invention suggests a binary information display device comprising a plurality of pins arranged in parallel at regular intervals, a support member for supporting the pins to be movable separately and linearly along the axis thereof, and a drive mechanism for pushing one end of each of the pins to extrude and retract the other end of the pin from and into a display surface formed on the support member. The drive mechanism comprises a linear cam to be moved in a direction orthogonal to the axis of the pins. The cam includes recesses and projections on its surface to move their pins in the axial direction. A linear movement mechanism is provided for moving the linear cam linearly. The linear movement mechanism has a stepper motor for rotating a shaft on the axis orthogonal to the pins. A conversion means is located between the shaft and the linear cam to convert a rotary motion of the shaft into a linear motion of the linear cam. A reset means is located near a moving area of the linear cam to set an original position of the stepper motor when the linear cam reaches a reference position.

In the above-mentioned binary information display device, the reset means may be a stopper to be put into contact with the linear cam, which has reached the reference position from one direction, to stop further movement of the linear cam in the same direction, or a sensor for sensing the linear cam, which has reached the reference position, and for transmitting an original position reset signal to the stepper motor.

According to the binary information display device of the present invention, when the stepper motor as a component of the linear movement mechanism is actuated by actuation of the drive mechanism, a rotary motion of the stepper motor on the axis of the shaft is converted into a linear motion of the linear cam by actuation of the conversion means. The linear cam is thereby moved linearly in the direction orthogonal to the axis of the pins.

Since the linear cam is provided with recesses and projections formed in a specific pattern, the recesses and the projections press one end of each of the pins in correlation to the movement of the linear cam, so that the pins are shifted in the axial direction. The other ends of a plurality of pins supported by the support member are thereby extruded from and retracted in the display surface, and binary information is displayed on the display surface.

Furthermore, in the above binary information display device, if the reset means consists of a stopper to be put into contact with the linear cam, which has reached the reference position from one direction, to stop further movement of the linear cam in the same direction, the linear cam is fixed at the reference position by contacting the stopper.

At this time, the shaft of the stepper motor connected to the linear cam through the conversion means is also fixed, and the stepper motor, to which a pulse voltage is applied continuously, is stepped out and forcibly placed in the original position. This makes it possible to reset the stepper motor at the original position without using any detection device, and to provide a compact and inexpensive binary information display device having a simple structure.

In the above binary information display device, if the reset means consists of a sensor for sensing the linear cam, which has reached the reference position, and for transmitting an original position reset signal to the stepper motor, it is possible to easily and reliably set the original position of the stepper motor relative to the linear cam placed at the reference position without using any expensive rotational position detector.

An embodiment of a binary information display device according to the present invention will be described below with reference to FIGS. 1 and 2.

Figure 1:
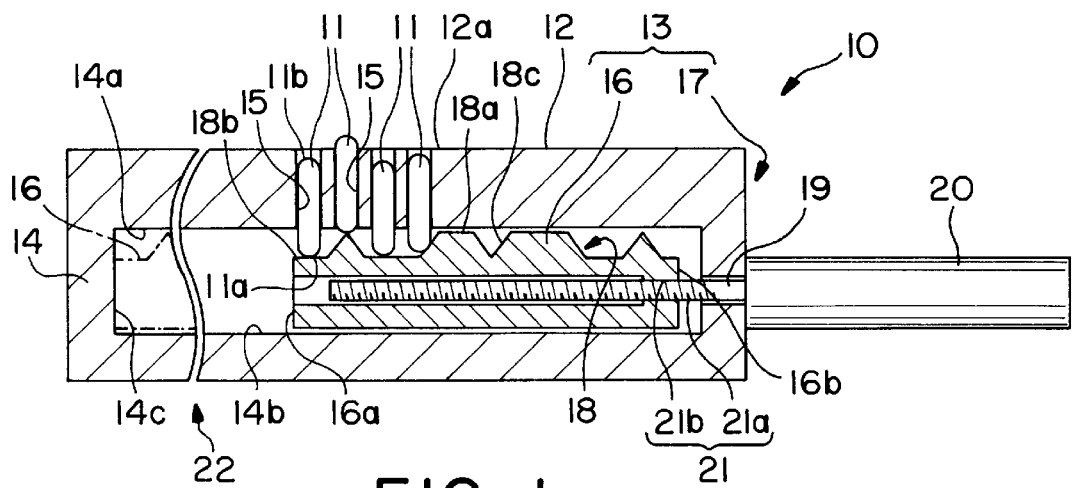
FIG. 1 is a longitudinal cross sectional view showing an embodiment of a binary information display device according to the present invention.
Figure 2:
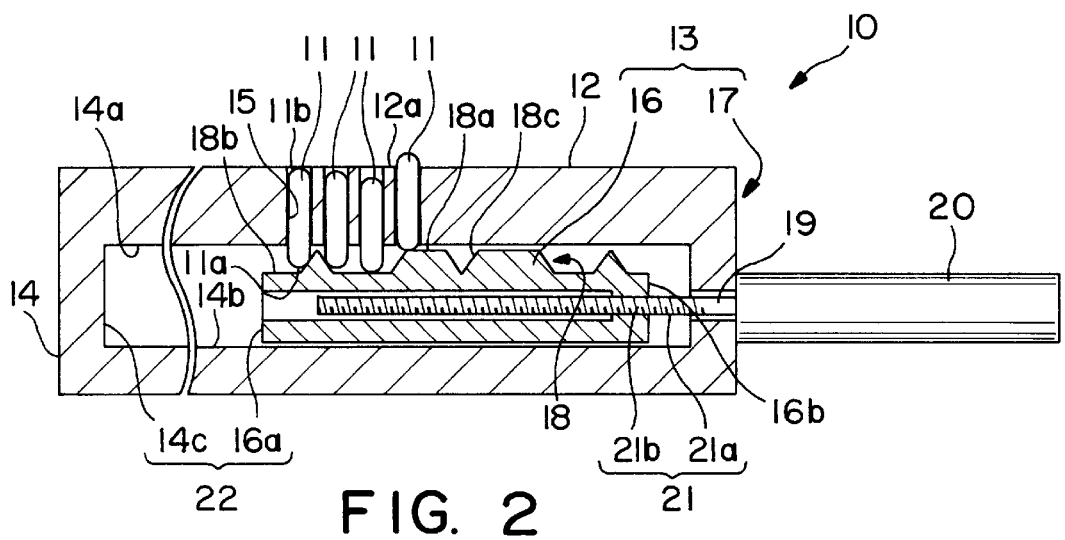
FIG. 2 is a longitudinal cross sectional view showing a state of the binary information display device shown in FIG. 1 in which different binary information from that shown in FIG. 1 is displayed.

A binary information display device 10 of this embodiment for displaying, for example, four bits of binary information, comprises, as shown in FIG. 1, four pins 11 arranged in parallel at equal intervals, a support member 12 for supporting the pins 11 slidably in the vertical direction, and a drive mechanism 13 for moving the pins 11 separately in the upward and downward directions by pushing up each of the pins 11 at a bottom end 11a thereof.

The support member 12 is a planar member fixed to a casing 14 on which the drive mechanism 13 is mounted, and fits the pins 11 in a plurality of through holes 15 formed vertically and spaced in parallel through the support member 12, respectively. These through holes 15 are formed as to have a little larger diameter than the pins 11, thereby supporting the pins 11, which are to be shifted by the drive mechanism 13, slidably only in the axial direction.

The drive mechanism 13 is constituted by, for example, a linear cam 16 housed in the casing 14, and a linear movement mechanism 17 for linearly moving the linear cam 16. The linear cam 16 is shaped like an almost rectangular plate, and is provided at the top thereof with an uneven surface 18 composed of projections 18a and recesses 18b between which there is a fixed difference of height as shown in FIG. 1.

The minimum space between each projection 18a and each recess 18b is set such as to be one-half the space between the pins 11 supported by the support member 12, and the projection 18a and the recess 18b are connected through a gently inclined face 18c. The pins 11 each have an almost spherical shape at least at the bottom end 11a thereof such as to be moved smoothly in the upward and downward directions by a force applied from the uneven surface 18.

The vertical distance from the top of the projection 18a to the bottom of the linear cam 16 is set a little shorter than that from a ceiling surface 14a to a bottom surface 14b inside the casing 14. Thereby, the linear cam 16 driven by the linear movement mechanism 17 is guided so as to linearly move only in the horizontal direction without swinging vertically in the casing 14 while being prevented from rotation.

The bottom end 11a of the pins 11 supported in the respective through holes 15 of the support member 12 are protruded from the ceiling face 14a of the casing 14 into the casing 14. The uneven surface 18 of the linear cam 16 is thereby placed in contact with the bottom ends 11a of the pins 11. When being moved upward by the projection 18a, the pin 11 is protruded upward from a display surface 12a located at the top of the support member 12, thereby displaying a value "1". When being placed in the recess 18b, the pin 11 is moved downward and the top end 11b thereof is positioned below the display surface 12a, by which a value "0" is displayed on the display surface 12a.

The linear movement mechanism 17 comprises, for example, a stepper motor 20 for rotating a horizontally elongating shaft 19 on the axis, and a feed screw mechanism 21 (conversion mechanism) for converting a rotary motion of the stepper motor 20 into a linear motion of the linear cam 16. The linear movement mechanism 17 further comprises a reset means 22 for setting an original position of the stepper motor 20 when the linear cam 16 is placed in a reference position.

The feed screw mechanism 21 is composed of a male screw 21a formed on the shaft 19 of the stepper motor 20, and a female screw 21b formed in the linear cam 16, and can convert a rotary motion of the stepper motor 20 into a linear motion of the linear cam 16 by a predetermined lead.

The reset means 22 consists of a butting surface 14c (stopper means) of the inner surface of the casing 14 located to block the course of the linear cam 16.

When the linear cam 16 is moved forward and placed into a reference position, where the pins 11 display reference binary information, that is, a position indicated by a chain line in FIG. 1, the butting surface 14c butts against a front end surface 16a of the linear cam 16 to stop further advance of the linear cam 16. Thereby, even if the stepper motor 20 is driven in response to a drive command signal applied thereto, the linear cam 16 butts against the butting surface 14c and is held in a stop state, and then, the shaft 19 is also held in a stop state through the feed screw mechanism 21. Therefore, the stepper motor 20 is stepped out until the drive command signal ends, and forcibly set in the original position at the completion of the drive command signal.

Accordingly to the binary information display device 10 having such structure, when a drive command signal is applied to the stepper motor 20 as a component of the linear movement mechanism 17 and the shaft 19 is rotated in response to the drive command signal, the linear cam 16 is moved linearly in accordance with the lead of the feed screw mechanism 21. Since the linear cam 16 is provided with the uneven surface 18 located in contact with the bottom ends 11a of the pins 11, the pins 11 are shifted vertically in accordance with ups and downs on the uneven surface 18. As a result, the top ends 11b of the pins 11 are extruded from and retracted into the display surface 12a according to a layout pattern of the projections 18a and the recesses 18b on the uneven surface 18, thereby displaying four bits of binary information.

For example, the binary information display device 10 shown in FIG. 1 is displaying four bits of binary information "0100" form the left of FIG. 1. Furthermore, when the linear cam 16 is linearly moved only by one pitch of layout of the projections 18a and the recesses 18b by making the shaft 19 of the stepper motor 20 to make a plurality of rotations, by which binary information "0001" is displayed as shown in FIG. 2.

In this case since the binary information display device 10 of this embodiment adopts the linear cam 16 and converts the rotary motion of the stepper motor 20 into the linear motion of the linear cam 16 by the feed screw mechanism 21, binary information does not need to be displayed in a plurality of patterns during one rotation of the motor 6, as distinct from before. Therefore, setting can be made such that the pattern of binary information is changed by, for example, a plurality of rotations of the shaft 19 of the stepper motor 20.

As a result, since the error in shape of the uneven surface 18 of the linear cam 16 is prevented from being sensitively reflected in binary information, the linear cam 16 is not required to be worked with high accuracy, and the number of manhours for working and the piece rate can be reduced. If the amount of binary information to be displayed increases, it is only necessary to increase the length of the linear cam 16. There is no need to increase the outside dimension of the cam 5 as in the conventional cylindrical cam 5. Accordingly, downsizing of the device can be achieved by reducing the size of the cam 5 in the crosswise direction.

In addition, since the stepper motor 20 is adopted, the applied voltage is relatively low and a complicated high-voltage circuit needed in use of bimetal is unnecessary, by which downsizing of the whole binary information display device 10 can be achieved.

In this embodiment, since the butting surface 14c, which retains the front end surface 16a of the linear cam 16 in contact therewith, is adopted as the reset means 22 for setting the original position of the stepper motor 20, the original position can be reset with reliability by a simple structure. As a result, accurate binary information can be displayed.

The setting of the original position of the stepper motor 20 is made as needed, more specifically, at power-on and the like. The setting in such cases, for example, at power-on, may be made when a power switch is turned on, or when a reset switch is operated in other cases.

This operation for setting the original position of the stepper motor 20 may be carried out in response to the application of a drive command signal, which allows the linear cam 16 to move toward the butting surface 14c by a distance at least corresponding to the entire operating distance, to the stepper motor 20 so that the setting is made reliably wherever the linear cam 16 is positioned.

According to the binary information display device 10 of this embodiment, since there is no need to mount an expensive and complicated detecting means, such as a rotational position detector for detecting the rotation angle of the stepper motor 20, it is possible to provide an inexpensive device which makes the most of the advantages of the stepper motor 20 in its capability to achieve simple and high-precision control.

Figure 3:
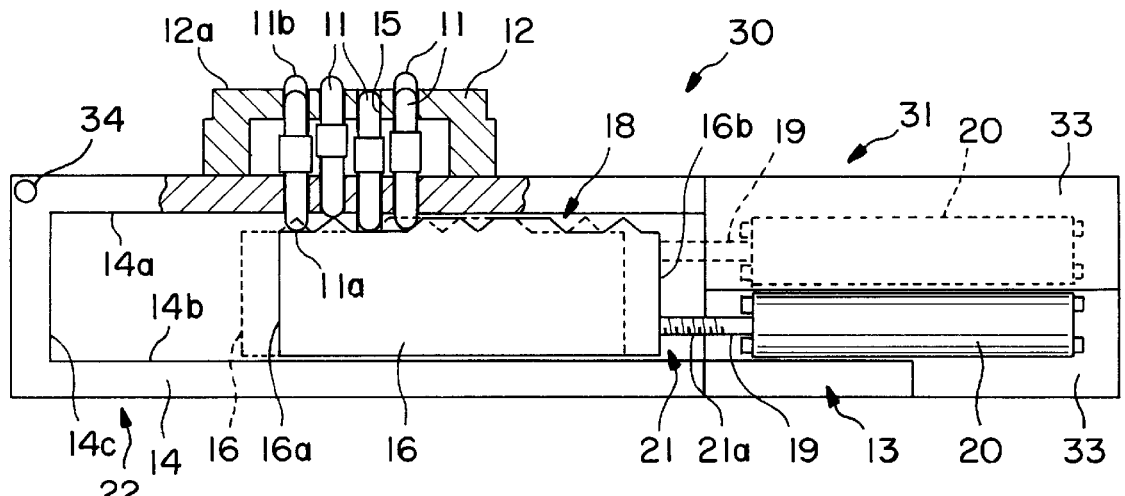
FIG. 3 is a longitudinal cross sectional view showing a second embodiment of a binary information display device according to the present invention.

Next, a second embodiment of a binary information display device according to the present invention will be described with reference to FIGS. 3 and 4.

In this embodiment, components common to the aforesaid first embodiment are denoted by the same numerals, and the description thereof is simplified.

This embodiment uses the above-mentioned binary information display device 10 as a braille display device 30. As shown in FIG. 3, a unit 31 for driving four parallel rows of pins 11, totalling to eight, displays one braille letter.

In other words, the braille display device 30 according to this embodiment comprises eight pins 11 arranged in two rows, a support member 12 for supporting the pins 11 slidably in the vertical direction, and two drive mechanism 13 located for the respective rows to move the pins 11 upward or downward. The drive mechanism 13 has a structure similar to that of the above-mentioned binary information display device 10.

Two stepper motors 20 composing the respective drive mechanisms 13 are laid to be shifted from each other in the vertical direction and to overlap in the crosswise direction so that the width of the unit 31 itself is as small as possible. In FIG. 4, a female screw hole 32 is formed on a linear cam 16 for commonality of components, a fixing substrate 33 fixes the stepper motor 20 to a casing 14, and a positioning projection 34 positions casings when braille display devices are located adjacent to one another as shown in FIG. 4.

According to the braille display device 30 thus structured, when two linear cams 16 are individually moved linearly by driving the stepper motors 20, the pins 11 are protruded from a display surface 12a row by row to display one braille letter. At power-on or the like, the original positions of the stepper motors 20 are set precisely by the actuation of a reset means 22 similarly to the binary information display device 10 in the first embodiment, and a correct braille letter corresponding to a drive command signal can be displayed.

Figure 4:
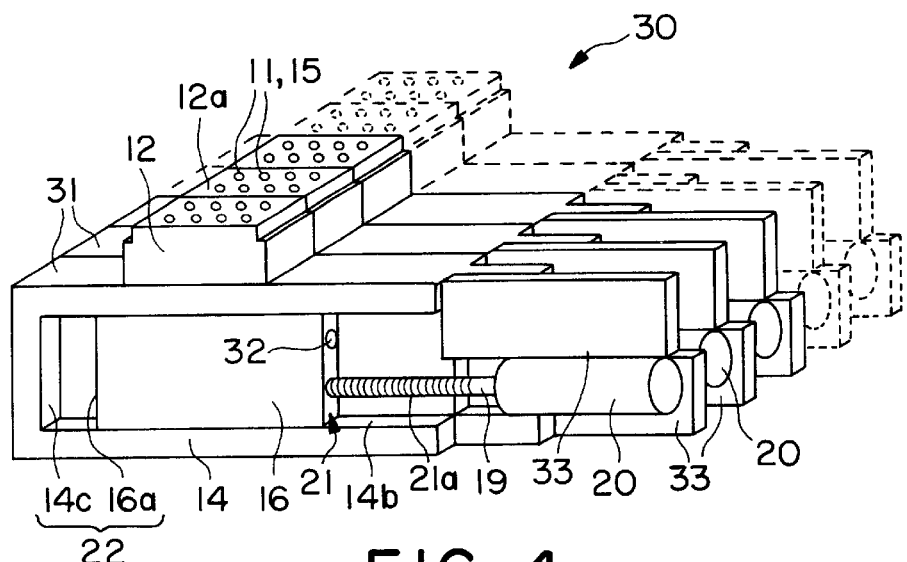
FIG. 4 is a perspective view of a braille display device in which binary information display devices shown in FIG. 3 are arranged side by side.

In such a braille display device 30, as shown in FIG. 4, the use of a plurality of units 31 arranged in the crosswise direction allows display of a plurality of braille letters in one line. In this case, since the braille display device 30 of this embodiment adopts a linear movement mechanism 17 having the stepper motor 20 and the linear cam 16, the dimension of the unit 31 in the crosswise direction can be reduced. Therefore, the units 31 are located so that braille letters displayed by the adjoining units 31 are not apart from each other, which makes it possible to reduce the display width and to increase the amount of information to be displayed in one line.

Although the butting surface 14c to butt against the front end surface 16a of the linear cam 16 is adopted as the reset means 22 in the above-mentioned first and second embodiments, a butting surface 14c to butt against a rear end surface 16b of the linear cam 16 may be adopted instead. Furthermore, a butting surface 14c to butt against a stopper (not shown) placed in an arbitrary position on the linear cam 16 may be formed in the casing 14.

Instead of the butting surface 14c, a sensor (not shown), such as a proximity switch or a microswitch, for detecting the predetermined position of the linear cam 16 may be provided so that the original position of the stepper motor 20 is set based on a detection signal from this sensor.

Figure 5:
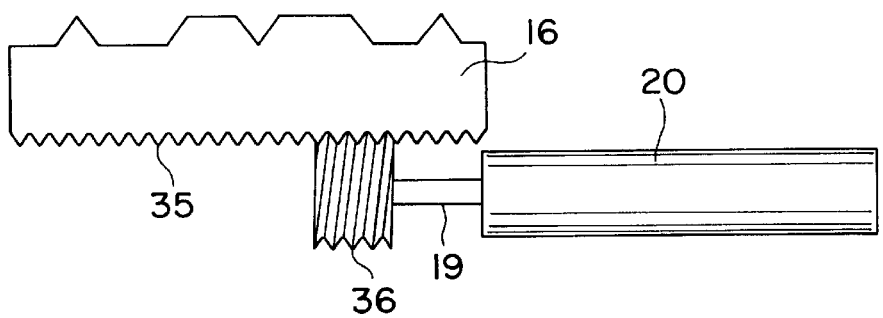
FIG. 5 is a front view showing another embodiment of a binary information display device according to the present invention.
Figure 6:
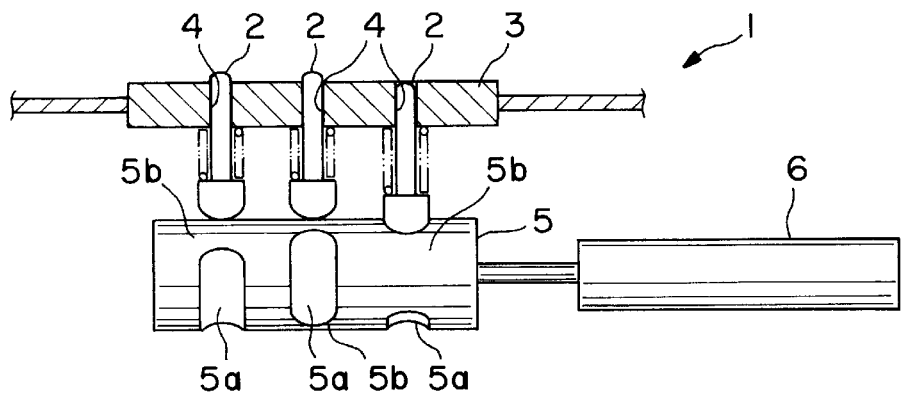
FIG. 6 is a front view showing a conventional binary information display device.

In the above-mentioned embodiments, although the feed screw mechanism 21 composed of the male screw 21a formed on the shaft 19 and the female screw 21b formed in the linear cam 16 is adopted as a conversion means for converting a rotary motion of the stepper motor 20 into a linear motion of the linear cam 16, a conversion means composed of, for example, a rack gear 35 and a worm gear 36 shown in FIG. 5 may be adopted instead.

Although four pins 11 are arranged in one row in the above embodiments, three or less, or five or more pins 11 may be arranged in one line instead.

Furthermore, although the movement direction of the pins 11 is the vertical direction and that of the linear cam 16 is the horizontal direction, the movement directions thereof are not limited to the above directions, and to not have to be orthogonal to each other.

As described in detail above, a binary information display device according to the present invention comprises a support member for supporting a plurality of pins arranged in parallel at regular intervals so that the pins can move separately and linearly along the axial direction, and a drive mechanism for pushing one end of each of the pins to extrude and retract the other end of the pin from and into a display surface. The drive mechanism is composed of a linear cam to be moved in a direction orthogonal to the axis of the pins so as to move the pins in the axial direction by recesses and projections on the surface of the linear cam. A linear movement mechanism for moving the linear cam linearly is provided and has a stepper motor for rotating a shaft on the axis orthogonal to the pins, a conversion means for converting a rotary motion of the shaft into a linear motion of the linear cam, and a reset means located near a movement area of the linear cam to set an original position of the stepper motor when the linear cam reaches a reference position. Therefore, the binary information display device has several advantages.

First, since the drive mechanism for driving the pins is embodied by a linear cam, it is possible to cope with the increase in number of pins with the increase in amount of binary information to be displayed without increasing the size of the drive mechanism in the crosswise direction. Therefore, downsizing of the device can be easily achieved, and this is particularly effective in a case in which a plurality of rows of pins are located adjacent to one another as in a braille display device.

The adoption of a reset means makes it possible to set the original position of a stepper motor without using any expensive rotational position detector having a complicated structure. It is thereby possible to get the most out of the greatest advantage of the stepper motor in its capability to achieve high-precision control in a simple structure and to provide an inexpensive device.

Furthermore, the adoption of the stepping motor is also advantageous in that the whole device including a power supply circuit can be downsized.

In the above-mentioned binary information display device, if the reset means is formed by a stopper to be butted against the linear cam, which has reached a reference position from one direction, to stop the further movement of the linear cam in the same direction, in addition to the above effects, the original position of the stepper motor can be reset most simply.

Furthermore, if the reset means is formed by a sensor for sensing the linear cam, which has reached the reference position and for transmitting an original position reset signal to the stepper motor, it is possible to provide a binary information display device having a simple structure similar to above.

I claim:
1. A binary information display device, comprising:
a plurality of pins, each said pin having opposed first and second ends and a longitudinal axis extending between said ends, said pins being arranged at regular intervals with their axes being parallel;
a support member for supporting said pins so that said pins can move separately and linearly along; and
a drive mechanism for pushing the second end of each of said pins to extrude and retract the second end of said pin from and into the display surface on said support member, said drive mechanism comprising a linear cam having an uneven cam surface with recesses and projections and being in sliding contact with the first end of each said pin, said linear cam being movable in a direction orthogonal to the axes of said pins to move said pins in their respective axial directions, and a linear movement mechanism for moving said linear cam linearly, said linear movement mechanism having a shaft extending in the direction orthogonal to the axes of the pins, a stepper motor for rotating the shaft, conversion means located between said shaft and said linear cam for converting rotation of said shaft into a linear motion of said linear cam, and reset means located near a moving area of said linear cam to set an original position of said stepper motor when said linear cam reaches a reference position.

2. A binary information display device according to claim 1, wherein said reset means is a stopper to be butted against said linear cam, which has reached the reference position from one direction, to stop further movement of said linear cam in the same direction.

3. A binary information display device according to claim 1, wherein said reset means is a sensor for sensing said linear cam, which has reached the reference position, and for transmitting an original position reset signal to said stepper motor.

* * * * *